May 19, 1953  B. E. WATT  2,639,420
RADAR SYSTEM FOR MOVING TARGET INDICATION
Filed Feb. 18, 1946  2 Sheets-Sheet 1

FIG. I

*INVENTOR*
BOB E. WATT
BY
William D. Hall.
*ATTORNEY*

INVENTOR
BOB E. WATT
BY
William D. Hall.
ATTORNEY

Patented May 19, 1953

2,639,420

UNITED STATES PATENT OFFICE 2,639,420

RADAR SYSTEM FOR MOVING TARGET INDICATION

Bob E. Watt, Tulsa, Okla., assignor, by mesne assignments, to the United States of America as represented by the Secretary of War Application February 18, 1946, Serial No. 648,531

7 Claims. (Cl. 343—9)

This invention relates to direction finding apparatus and more particularly to direction finding apparatus designed to locate moving objects in space by radio means.

Radio object locating systems for determining the position of moving objects in space normally employ a transmitter as a source of high frequency, high power exploratory pulses of relatively short time duration. These exploratory pulses are radiated from a directional antenna that also serves as a receiving antenna after the exploratory pulses have been transmitted. The exploratory pulses are reflected or reradiated from objects in space and a portion of this reflected energy is picked up by the system antenna. A receiver connected to the antenna amplifies and detects the received energy in such a manner that fixed and moving objects cause distinctive signals. This is normally done by combining the returned echoes with a reference voltage coherent with the transmitted pulses. Echoes from fixed targets have a constant phase with respect to the reference voltage and hence video signals resulting from the combination of the echoes from fixed targets and the reference voltage will be of constant amplitude. Echoes from moving targets will have a variable phase with respect to the reference voltage due to the change in position of the reflecting object, therefore, video signals representing moving objects will vary in amplitude. A fixed object cancelling circuit is then employed to eliminate signals of constant amplitude while retaining signals of varying amplitude. When the retained signals are applied to an indicator, the information delineated thereon will represent only moving targets. A more complete description of the basic principles of a moving target indication system is set forth in the copending application of Robert H. Dicke entitled "Communication System," Serial No. 590,052, filed April 24, 1945 and issued on December 29, 1950 as Patent No. 2,535,274.

In order to obtain satisfactory operation in a moving target indication system, it is necessary to maintain a constant interval of time between successive exploratory pulses and it is also necessary to provide as a part of the fixed object cancelling circuit a delay for received signals that is substantially equal in time to the time interval between successive exploratory pulses.

It is an object of the present invention therefore to provide a novel circuit for maintaining the proper spacing in time of exploratory pulses and for providing the proper delay in received signals.

For a better understanding of the invention together with other and further objects thereof reference is had to the following description taken in connection with the accompanying drawings in which.

Figure 1:
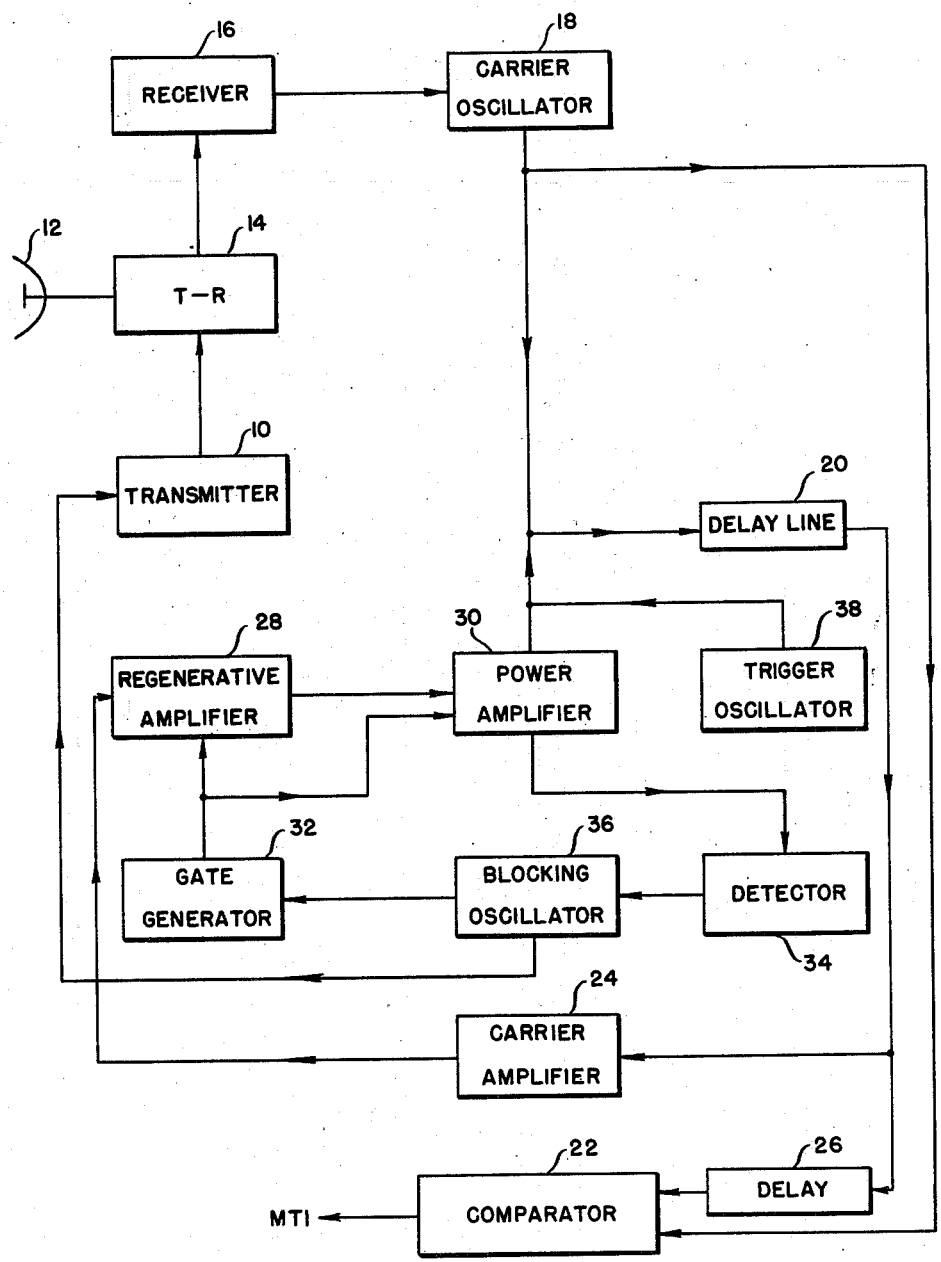
Fig. 1 is a schematic diagram in block form of the present invention.

Referring now more particularly to Fig. 1 of the drawings for a detailed description of the circuit of the present invention, a transmitter 10 supplies exploratory pulses to an antenna 12 through a transmit-receive switch or T-R device 14. After the exploratory pulses have been transmitted, T-R device 14 connects antenna 12 to the system receiver 16. Receiver 16 is so designed that the video signals from the receiver representing fixed objects are of constant amplitude while video signals from the receiver representing moving targets undergo a cyclic variation in amplitude. A receiver of this type is shown in Patent No. 2,421,020. This may be done by beating the returning echo signals with a reference oscillation that always bears a fixed phase relation to the transmitted pulses.

The output of receiver 16 is applied as an activating or modulating signal to pulse carrier frequency oscillator 18. The output of oscillator 18 is applied to the input of a delay line 20 and to the input of a comparator circuit 22. The output of delay line 20 is applied to the input of a carrier frequency amplifier 24 hereinafter termed a carrier amplifier and to a second delay circuit 26. The output of delay circuit 26 is applied to a second input connection to comparator circuit 22. The output of carrier amplifier 24 is applied through a regenerative amplifier 28 to a power amplifier 30. A voltage gate is supplied to both amplifiers 28 and 30 by a gate generator 32. One output of power amplifier 30 is applied to the input of delay line 20 while a second output of power amplifier 30 is applied through a detector 34 to the input of a blocking oscillator 36. Blocking oscillator 36 supplies an initiating signal to gate generator 32 and transmitter 10. A trigger oscillator 38 supplies a signal to the input of delay line 20. Moving target indication data is taken from comparator circuit 22 and applied to an indicator (not shown).

Figure 2:
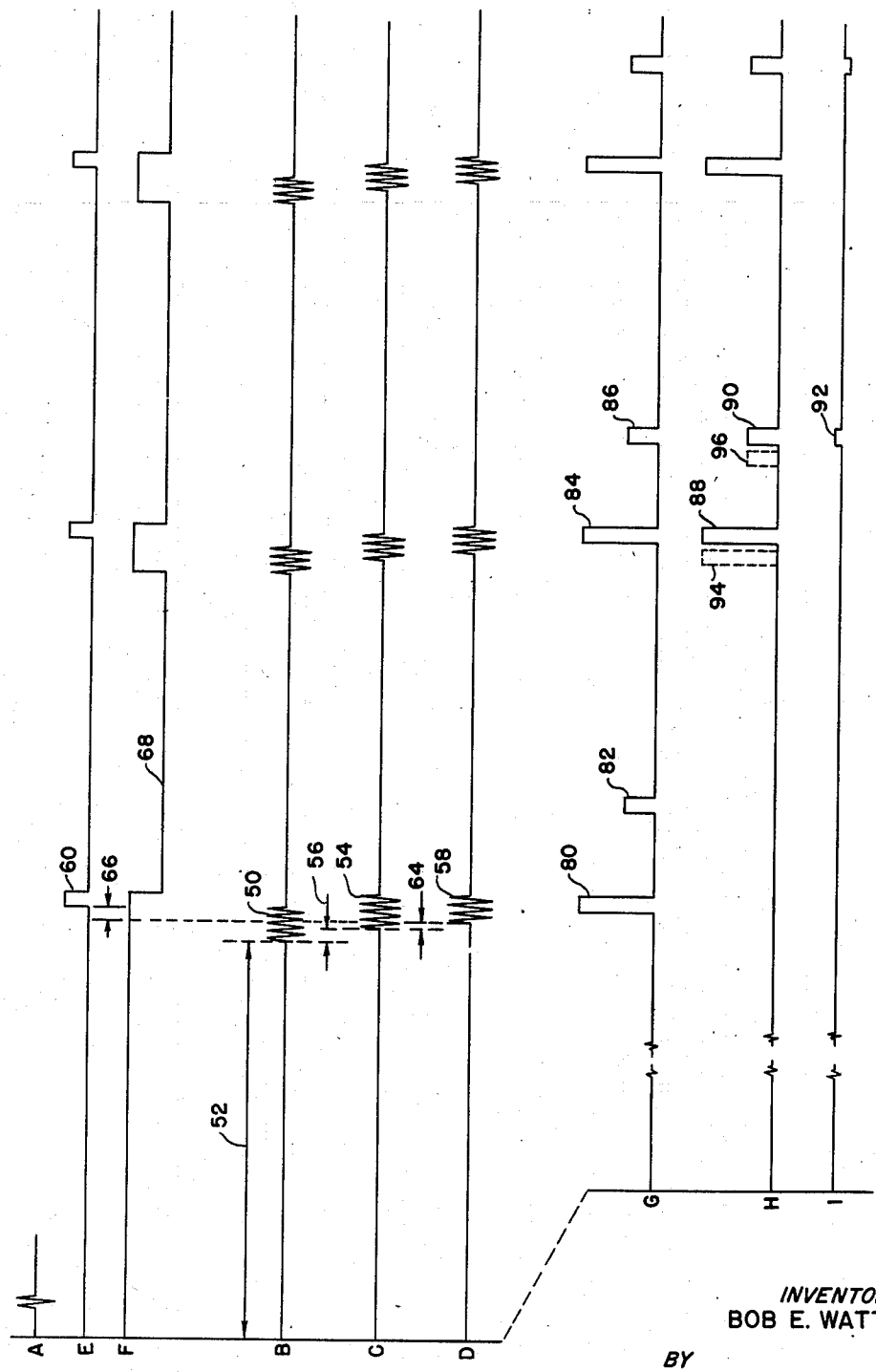
Fig. 2 is a series of voltage waveforms taken at selected points in the circuit of Fig. 1.

Reference is now had jointly to Figs. 1 and 2 of the drawings for a detailed description of the operation of the present invention. With power supplied to all units in the conventional manner but with the system not in operation, trigger oscillator 38 is caused to produce a pulse of oscillatory energy. This pulse of energy is illustrated in Fig. 2A of the drawings. Since the signal from trigger oscillator 38 is required only at the time the system is placed in operation and is not required thereafter, oscillator 38 may, for example, be push-button-controlled so that a single pulse of oscillatory energy of a few microseconds' duration is produced each time the push-button is depressed. Any other convenient device well known in the art may be employed to control this circuit. The signal now supplied by trigger oscillator 38 could of course be supplied by carrier oscillator 18 since the signals from these two oscillators are of the same frequency and are both connected to the input of delay line 20. If oscillator 18 is used to initiate the synchronizing signal a suitable switch or control may be added to oscillator 18 to cause this circuit to produce the desired signal. Oscillator 38 may then be omitted.

The output of oscillator 38 is applied to the input of delay line 20. After a delay determined by the constants of delay line 20 a similar signal will appear at the output thereof and this signal is applied to the input of carrier amplifier 24. This signal is illustrated as pulse 50, Fig. 2B. The interval 52 between the leading edge of the pulse in Fig. 2A and the leading edge of pulse 50, Fig. 2B, is equal to the time delay in line 20. Carrier amplifier 24 amplifies the signals received from delay line 20 and in turn applies them to the input of regenerative amplifier 28. The output of amplifier 24 is shown as pulse 54 in Fig. 2C. The time interval 56 between the leading edge of pulse 50 and the leading edge of pulse 54 is due to the time delay in amplifier 24. This time delay is a function of the width of the pass band of amplifier 24 and therefore amplifier 24 may be designed with a variable width pass band to provide adjustment in the delay channel.

The output of carrier amplifier 24 is passed through two amplifiers 28 and 30, both of which are gated by a signal from gate generator 32. The signal from generator 32 is such that amplifiers 28 and 30 are operative before the pulse from amplifier 24 is applied to amplifier 28. The output of amplifier 30, shown as pulse 58, Fig. 2D, is applied through detector 34 to the blocking oscillator 36. Detector 34 rectifies the signal from amplifier 30 and provides oscillator 36 with a potential that causes it to be operative and to produce a pulse of energy shown as pulse 60, Fig. 2E. It is this pulse 60 that causes transmitter 10 to be operative and the trailing edge of this pulse 60 is also used to cause gate generator 32 to supply a deactivating signal to amplifiers 28 and 30. The pulse from oscillator 36 also serves to synchronize the operation of generator 32 with the operation of the rest of the system. In Fig. 2 it can be seen that a slight delay 64 occurs between pulse 54, Fig. 2C, and pulse 58, Fig. 2D. This is the result of delays in amplifiers 28 and 30. A similar delay 66 occurs between the leading edge of pulse 58 and the leading edge of pulse 60 resulting from delays in detector 34 and oscillator 36. These various delays will vary with the particular design of the circuits used; however, their magnitude may be easily determined and the other delays adjusted accordingly. The output of gate generator 32 is shown in Fig. 2F. A relatively long pulse 68 is produced by generator 32 beginning at a time corresponding to the trailing edge of pulse 60, Fig. 2E. Pulse 68 is such that amplifiers 28 and 30 are rendered inoperative when it is applied thereto and the duration of this pulse, as determined by the constants of generator 32, is such that it terminates just before the next synchronizing pulse is applied to amplifier 28.

A portion of the output from power amplifier 30 is applied to the input of delay line 20 to provide the next synchronizing pulse. The output of amplifier 30 replaces the output of oscillator 38; therefore, the output of this latter circuit is no longer required. The output of power amplifier 30 will be delayed by line 20 and the synchronizing cycle will be repeated. It can be seen that the period of the synchronizing cycle is determined by the time delay in line 20 plus the time delays in the various amplifiers.

The output of receiver 16 consists of video pulses representing echoes resulting from the reflection of the exploratory pulses by fixed and moving objects in space. Pulses representing successive echoes from a fixed target will have the same amplitude but the amplitude of pulses representing successive echoes from a moving target will undergo a cyclic variation. The video pulses in the output of receiver 16 are applied to carrier oscillator 18 in a manner to cause amplitude modulation of the signal produced therein. The pulse modulated signals from oscillator 18 have the same carrier frequency as signals from trigger oscillator 38. These pulses are applied directly to the input of delay line 20. The output of delay line 20 is applied through a second delay network 26 to one input of comparator circuit 22. Delay network 26 may represent the delay in several stages of amplification interposed between delay line 20 and comparator 22 or it may be a delay type transmission line.

The output of carrier oscillator 18 is also applied directly to comparator 22. Comparator circuit 22 compares the amplitude of pulses received simultaneously at the two input connections and supplies at the output terminal marked MTI in Fig. 1 signals representing moving targets. Figs. 2G, 2H and 2I illustrate the method of comparison employed in this system.

Pulses 80, 82, 84 and 86, Fig. 2G, represent signals that are applied directly to comparator circuit 22 from oscillator 18. For purposes of illustration only, pulses 80, 82, 84 and 86 have been shown as video pulses, although it is to be understood that these signals are actually pulses of oscillatory energy. Pulse 80, Fig. 2G, represents the exploratory pulse and occurs at the same time as pulse 60, Fig. 2E. Pulse 82, Fig. 2G, represents an echo resulting from the reflection of the exploratory pulse from a moving object. The spacing in time between pulses 80 and 82 is indicative of the range from the radio-object locating system to the object causing pulse 82. Pulse 84 represents the exploratory pulse next following pulse 80 and pulse 86 is the echo pulse representing the same object as does pulse 82. In this description it has been assumed that the motion of the reflecting object causes pulse 86 to be of greater amplitude than is pulse 82.

Fig. 2H represents the input to comparator circuit 22 from delay network 26. Pulses 88 and 90 represent the same output signals from oscillator 18 as do pulses 80 and 82 but the former are delayed in time by an amount equal to the spacing between successive exploratory pulses so that they occur in time coincidence with pulses 84 and 86, Fig. 2G. Comparator circuit 22, as before stated, compares the signals applied at its two inputs and produces a signal equal to the difference, if any, of the amplitude of the applied signals. Many comparator circuits of this type are known in the art and one such circuit is shown in "Radio Engineers' Handbook" by F. E. Terman, page 587. Pulses 84 and 88 are equal in amplitude so no signal is obtained at the output (marked MTI in Fig. 1) of comparator circuit 22. Pulses 86 and 90 are of different amplitudes so that a signal appears at the output of circuit 22 at the time pulses 86 and 90 are applied to the inputs. This output signal is illustrated as pulse 92, Fig. 2I. The spacing in time between pulse 88, Fig. 2H, and pulse 92, Fig. 2I, is indicative of the range from the radio object locating system to the target causing pulse 92. Therefore, the signals from comparator 22 may be applied to any of the various types of indicators to provide range information of moving targets surrounding the radio object-locating system. This range information may be combined on the system indicator with elevation or azimuth information in the same manner that it is combined in conventional radio object-locating systems.

Dotted pulses 94 and 96 illustrate the position in time of the signals 88 and 90 at the output of 20 and hence illustrate the need for delay means 26. This may become more evident by recalling that the time interval between pulses 80 and 94 is equal to the time delay incurred by the pulse 80 in the delay circuit 20 whereas the time interval between pulses 80 and 84 is equal to the time interval between successive exploratory pulses, which later time interval is equal to the time delay incured by a pulse in delay circuit 20 plus the time delay incurred in amplifiers 24, 28 and 30.

No echo pulses representing fixed targets have been illustrated because the cancellation of these pulses are exactly analogous to the cancellation of the pulses 84 and 88.

It is impossible for the returning echo signals to trigger the blocking oscillator 36 and thus cause an exploratory pulse to be transmitted because amplifiers 28 and 30 are held inoperative by gate generator 32 during the time that echoes are being received. Likewise, the pulse of energy employed to trigger oscillator 36 will not cause an erroneous indication to appear on the indicator because this pulse occurs at what corresponds to the extreme range of the system and this extreme range may not even be displayed on the indicator.

The advantages of this system are thought to be obvious from the foregoing discussion. The same delay line is employed to synchronize the pulse repetition frequency of the transmitter and to store or delay the received echo pulses. This increases the stability of the system. Adjustments may be made in the delay of the transmitter synchronizing channel by varying the delay in amplifier 24 and adjustments may be made in the signal delay channel by adjustment of delay means 26. Relatively simple and stable circuit elements have been employed throughout and no complicated signal mixing or separating means are employed.

Therefore while there has been described what is at present considered the preferred embodiment of the present invention, it should be obvious to those skilled in the art that various changes and modifications may be made therein without departing from the invention.

What is claimed is:

1. In a radio object locating system including a pulse type transmitter, a receiver supplying echo signals and an antenna connected to said receiver and transmitter, the apparatus comprising a carrier oscillator, means for modulating the output of said oscillator with the output of said receiver, a first and second delay means, comparison means, means for applying the output of said oscillator to a first input of said comparison means through said first and said second delay means in series, means for applying the output of said oscillator directly to a second input of said comparison means, a first amplifier means, a first and a second gated amplifier means, a detector means, means for applying the output of said first delay means to said detector means through said first amplifier means and said first and second gated amplifiers in series, the output of said second gated amplifier being connected to the input of said first delay means, a gate generator means supplying a controlling signal and connected to said first and second gated amplifier means, a blocking oscillator connected to the output of said detector means and responsive to the output of said detector means, said blocking oscillator being connected to said gate generator and said transmitter for supplying a controlling signal thereto, and a source of oscillatory energy connected to the input of said first delay means.

2. A radio object locating system including a pulse type transmitter, a receiver supplying target echo signals, a receiver channel including a source of oscillatory energy, a first delay means connected to said source of energy, at least one gated amplifier means, a detector means, means for applying the output of said first delay means to said detector means through said amplifier means in series, a gate generator means supplying a controlling signal and connected to said gated amplifier means, a pulse generator means connected to the output of said detector for supplying a controlling signal to said gate generator means and said transmitter, said controlling signal causing said transmitter to generate an exploratory pulse, means for applying the output of said amplifier means to the input of said first delay means, whereby a signal is caused to be recirculated through said receiver channel and thereby periodically supply a controlling signal to said transmitter, a second delay means, comparison means, means for applying the output of said receiver to a first input connection to said comparison means through said first and said second delay means, and means for applying the output of said receiver to a second input of said comparison means without appreciable delay, said comparison means combining the two input signals in a manner to provide, as an output signal therefrom, data relating to moving objects only.

3. A radio object locating system including a pulse type transmitter, a receiver supplying echo signals reflected from objects in the path of pulses transmitted by said transmitter, delay means having an input connection coupled to said receiver and an output connection, a detector means, amplifier coupling means connected to the output connection of said delay means for applying the output of said delay means to said detector means, means for periodically disabling said coupling means for predetermined intervals, a pulse generator means connected to the output of said detector for supplying a controlling signal to said disabling means and said transmitter, said controlling signal causing said transmitter to generate an exploratory pulse, means for applying the output of said amplifier coupling means to the input of said delay means, whereby a controlling signal will be periodically supplied to said transmitter, comparison means for differentially combining two input signals and producing an output signal therefrom, means for connecting the output connection of said delay means to a first input connection of said comparison means, and means for applying the output of said receiver to a second input of said comparison means without appreciable delay.

4. A radio object locating system including a pulse type transmitter, and a receiver channel including a source of oscillatory energy, delay means having an input connection connected to said source of oscillatory energy and an output connection, a gated amplifier means, a detector means, means for connecting the output connection of said delay means to said detector means through said amplifier means in series, a gate generator means supplying a controlling signal and connected to said gated amplifier means, a pulse generator means connected to the output of said detector for supplying a controlling signal to said gate generator means and said transmitter, said controlling signal causing said transmitter to generate an exploratory pulse, and means for applying the output of said amplifier means to the input of said delay means, whereby a signal is caused to be recirculated through said receiver channel and thereby periodically supply a controlling signal to said transmitter.

5. The system of claim 4, further including comparison means for differentially combing two input signals and producing an output signal, delay means coupling the output connection of the first-named delay means to a first input connection of said comparison means, and means for coupling the output of said source of oscillatory energy to a second input connection of said comparison means without appreciable delay.

6. A radio object locating system including a pulse transmitter, delay line means having an input and an output connection, coupling means having its input coupled to said output connection and its output coupled to said input connection, said delay line means and coupling means forming a first closed series loop, trigger generator means having its input coupled to said first closed series loop, gate generator means having its input connected to the output from said trigger generator means and its output connected to said coupling means for rendering said first series loop alternately conductive and non-conductive for predetermined periods, said trigger generator means, gate generator means, and coupling means forming a second closed series loop, and means for applying the output of said trigger generator means to trigger said transmitter.

7. A radio object locating system including a pulse transmitter, delay line means having an input and an output connection, coupling means having its input coupled to said output connection and its output coupled to said input connection, said delay line means and coupling means forming a first closed series loop, trigger generator means having its input coupled to said first closed series loop, gate generator means having its input connected to the output from said trigger generator means and its output connected to said coupling means for rendering said first series loop alternately conductive and non-conductive for predetermined periods, said trigger generator means, gate generator means, and coupling means forming a second closed series loop, means for applying the output of said trigger generator means to trigger said transmitter, oscillator means having its output coupled to the input connection of said delay line means, comparison means for differentially combining two input signals to produce an output signal, means for coupling said output connection of said delay line means to said comparison means to provide one input therefor, and means for coupling the output of said oscillator means without substantial delay as the other input to said comparison means.

BOB E. WATT.

References Cited in the file of this patent
UNITED STATES PATENTS

| Number | Name | Date |
|---|---|---|
| 2,333,688 | Shepard | Nov. 9, 1943 |
| 2,400,309 | Kock | May 14, 1946 |
| 2,407,000 | Evans | Sept. 3, 1946 |
| 2,408,742 | Eaton | Oct. 8, 1946 |
| 2,422,382 | Winchel | June 17, 1947 |
| 2,480,038 | Mason | Aug. 23, 1949 |
| 2,532,546 | Forbes | Dec. 5, 1950 |